(12) United States Patent
Sasaki et al.

(10) Patent No.: US 11,850,986 B2
(45) Date of Patent: Dec. 26, 2023

(54) HEADREST AND VEHICLE SEAT

(71) Applicant: TACHI-S CO., LTD., Tokyo (JP)

(72) Inventors: Katsuhiko Sasaki, Tokyo (JP);
Xuandong Jin, Tokyo (JP); Takahide Kirihara, Tokyo (JP); Naotake Hashimoto, Tokyo (JP); Tsutomu Hoshi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 143 days.

(21) Appl. No.: 17/415,427

(22) PCT Filed: Dec. 18, 2019

(86) PCT No.: PCT/JP2019/049678
§ 371 (c)(1),
(2) Date: Jun. 17, 2021

(87) PCT Pub. No.: WO2020/130050
PCT Pub. Date: Jun. 25, 2020

(65) Prior Publication Data
US 2022/0063464 A1  Mar. 3, 2022

(30) Foreign Application Priority Data
Dec. 19, 2018  (JP) ................... 2018-237300

(51) Int. Cl.
*B60N 2/888* (2018.01)
*B60N 2/803* (2018.01)

(52) U.S. Cl.
CPC ............ *B60N 2/888* (2018.02); *B60N 2/803* (2018.02)

(58) Field of Classification Search
CPC .. B60N 2/888; B60N 2/803; B60R 2021/0048
See application file for complete search history.

(56) References Cited

U.S. PATENT DOCUMENTS 3,528,703 A * 9/1970 Ohta .................. B60N 2/85
297/391
3,838,870 A * 10/1974 Hug ................... B60N 2/838
297/216.12
(Continued)

FOREIGN PATENT DOCUMENTS

CN  101119870 A  2/2008
CN  102205807 A  10/2011
(Continued)

OTHER PUBLICATIONS

JP-S60160755-U, Oct. 1985 (Year: 1985).*
(Continued)

*Primary Examiner* — David R Dunn
*Assistant Examiner* — Tania Abraham
(74) *Attorney, Agent, or Firm* — Paratus Law Group, PLLC (57) ABSTRACT

The present invention provides a headrest that is low-cost but still provides impact mitigation performance, and a vehicle seat having this headrest. A headrest of a vehicle seat includes: a headrest frame that is formed of at least one plate material and is fixed to a seatback frame of the vehicle seat; a pad that covers the headrest frame; and a skin that covers the pad. A contact section is provided at the lower part of the headrest frame, said lower part being located on the seatback-frame side, and the contact section is located closer to the rear surface of the headrest than the upper part of the headrest frame is, said upper part being located on the opposite side to the seatback-frame side.

6 Claims, 8 Drawing Sheets

(56) References Cited

U.S. PATENT DOCUMENTS

| | | | | |
|---|---|---|---|---|
| 2002/0140271 | A1* | 10/2002 | Owen | B60N 2/803 |
| | | | | 297/391 |
| 2007/0090669 | A1* | 4/2007 | Aharoni | B60N 2/888 |
| | | | | 297/61 |
| 2008/0265637 | A1 | 10/2008 | Niitsuma et al. | |
| 2009/0021060 | A1 | 1/2009 | Ishijima et al. | |
| 2011/0241403 | A1 | 10/2011 | Yamaguchi et al. | |
| 2013/0300166 | A1* | 11/2013 | Munemura | B60N 2/4228 |
| | | | | 297/216.12 |
| 2014/0327287 | A1 | 11/2014 | Komatsubara et al. | |

FOREIGN PATENT DOCUMENTS

| | | |
|---|---|---|
| JP | S53-020229 A | 2/1978 |
| JP | 2003-054342 A | 2/2003 |
| JP | 2005-319119 A | 11/2005 |
| JP | 2009-023425 A | 2/2009 |
| JP | 2013-132388 A | 7/2013 |

OTHER PUBLICATIONS

JP-H0313378-Y2, Mar. 1991 (Year: 1991).*
Feb. 4, 2020, International Search Report issued for related PCT Application No. PCT/JP2019/049678.

* cited by examiner

HEADREST AND VEHICLE SEAT

CROSS REFERENCE TO PRIOR APPLICATION

This application is a National Stage Patent Application of PCT International Patent Application No. PCT/JP2019/049678 (filed on Dec. 18, 2019) under 35 U.S.C. § 371, which claims priority to Japanese Patent Application No. 2018-237300 (filed on Dec. 19, 2018), which are all hereby incorporated by reference in their entirety.

TECHNICAL FIELD

The present invention relates to a headrest and a vehicle seat.

BACKGROUND ART

In a vehicle such as a truck, a cabin where a seat for an occupant is installed and a cargo bed are separated. A panel forming a rear wall of the cabin is disposed behind the seat installed in the cabin, and a distance between a headrest of the seat and the panel is relatively narrow. At the time of a vehicle collision, the headrest may be pushed by the head of the occupant and displaced rearward, and the headrest displaced rearward may abut on the panel. When the headrest abuts on the panel, an impact acting on the head of the occupant may become stronger due to rigidity of the panel.

From the viewpoint of mitigating the impact acting on the head of the occupant, as the headrest of the seat installed in a vehicle of this type, a headrest in which a pad includes a soft pad material and a hard pad material is known (for example, see Patent Literature 1), Energy cannot be absorbed by the soft pad material is absorbed by the hard pad material, and the impact acting on the head of the occupant is mitigated.

Patent Literature 1: JP 2003-54342 A

SUMMARY OF INVENTION

The headrest described in Patent Literature 1 requires the hard pad material in addition to the soft pad material. Impact mitigation performance of the headrest is stipulated by law, and if the hard pad material is omitted, the impact mitigation performance stipulated by the law may not be satisfied. However, the hard pad material has a lower foaming ratio than the soft pad material, requires a larger amount of foaming material than the soft pad material when compared in the same volume, and is high in cost.

The present invention has been made in view of the above circumstances, and an object thereof is to provide a headrest that is low in cost but does not impair impact mitigation performance and a vehicle seat including the headrest.

A headrest of a vehicle seat according to an aspect of the present invention includes: a headrest frame formed of at least one plate and fixed to a seat back frame of the vehicle seat; a pad covering the headrest frame; and a cover covering the pad. An abutting portion is provided at a lower portion of the headrest frame, the lower portion being disposed proximal to a seat back frame, and the abutting portion is located rearer of the headrest than an upper portion of the headrest frame, the upper portion being disposed distal to the seat back frame.

A vehicle seat according to another aspect of the present invention includes the headrest.

According to the present invention, the headrest that is low in cost but does not impair the impact mitigation performance and the vehicle seat including the headrest can be provided.

DESCRIPTION OF EMBODIMENTS

Figure 1:
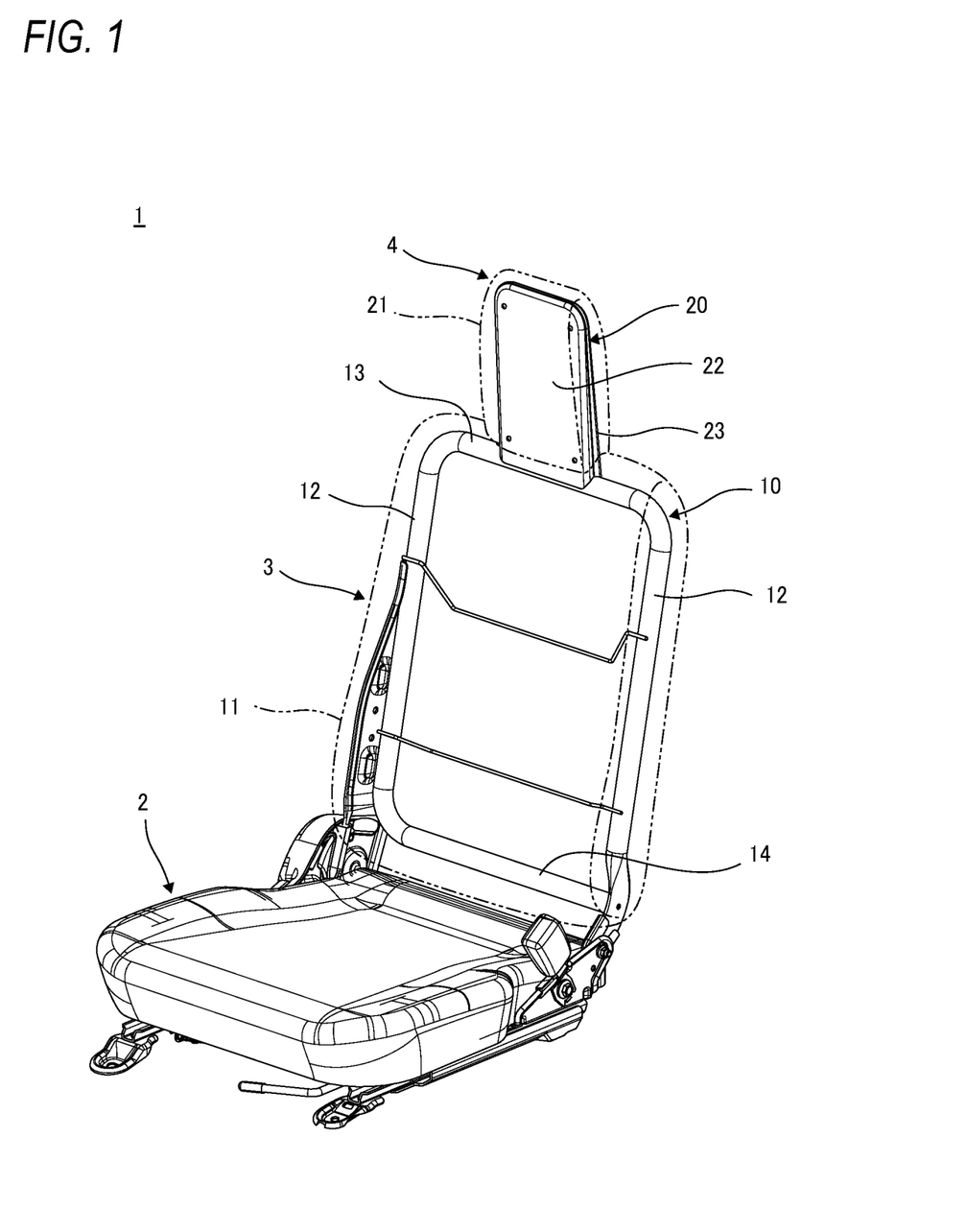
FIG. 1 is a perspective view of an example of a vehicle seat for illustrating an embodiment of the present invention.
Figure 2:
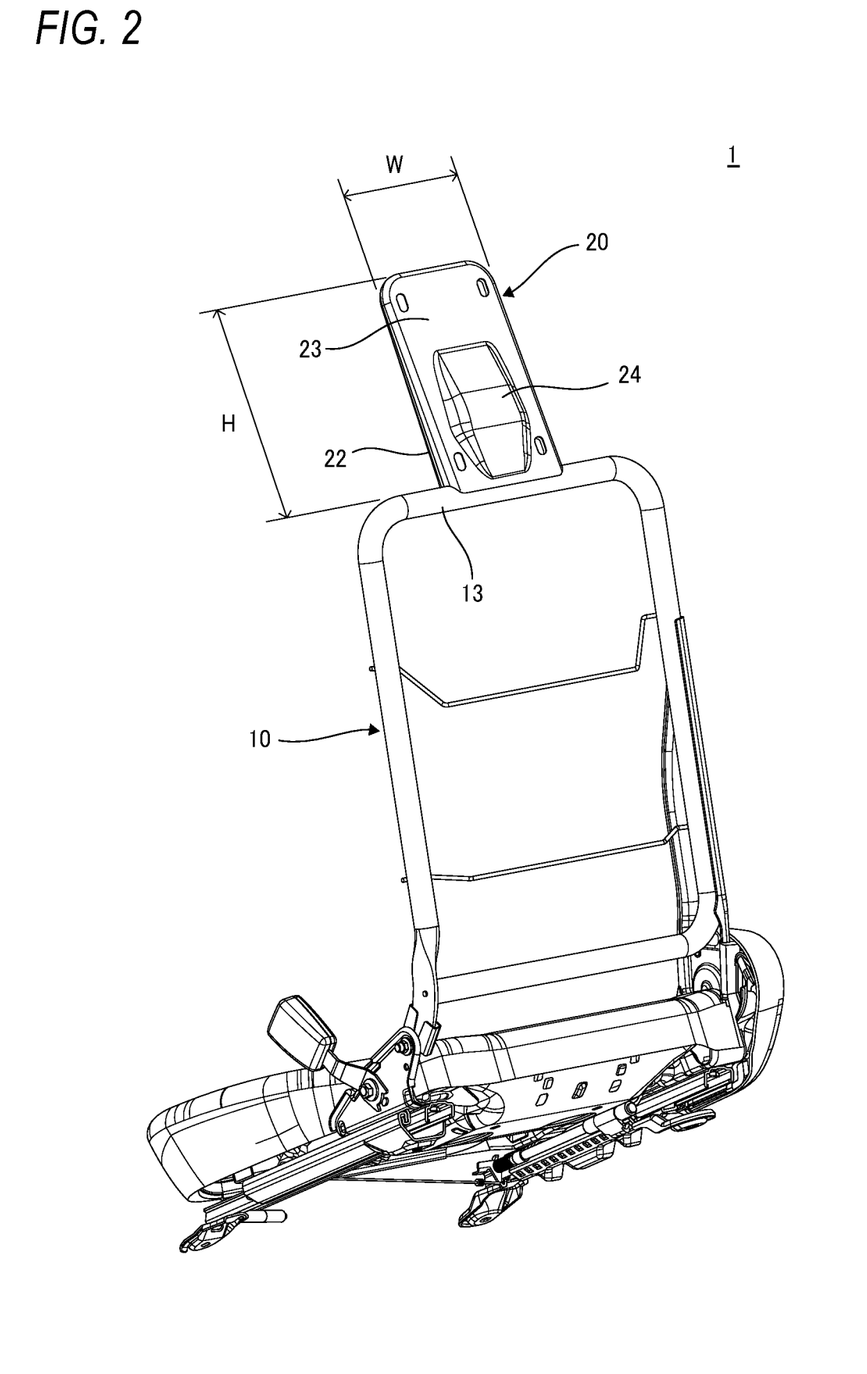
FIG. 2 is a perspective view of a rear surface side of the vehicle seat of FIG. 1.

FIGS. 1 and 2 show an example of a vehicle seat for illustrating an embodiment of the present invention.

A vehicle seat 1 is a seat mounted on a vehicle such as an automobile and the like, and includes a seat cushion 2 that supports buttocks and thighs of an occupant seated on the seat 1, a seat back 3 that supports a waist and a back of the occupant, and a headrest 4 that supports a head of the occupant. Hereinafter, a surface of the headrest 4 in contact with the head of the occupant is referred to as a front surface of the headrest 4, and a surface of the headrest 4 opposite to the surface in contact with the head of the occupant is referred to as a rear surface of the headrest 4.

The seat back 3 includes a seat back frame 10, a pad 11 that covers the seat back frame 10, and a cover (not illustrated) that covers the pad 11.

The seat back frame 10 includes a pair of left and right back side frames 12, an upper frame 13 that bridges upper end portions of the pair of back side frames 12, and a lower frame 14 that bridges lower end portions of the pair of back side frames 12, The pair of back side frames 12, the upper frame 13, and the lower frame 14 are made of a metal material such as steel. In the example illustrated in FIGS. 1 and 2, the pair of back side frames 12, the upper frame 13, and the lower frame 14 are integrally formed of a tubular material bent in a frame shape.

The headrest 4 includes a headrest frame 20, a pad 21 that covers the headrest frame 20, and a cover (not illustrated) that covers the pad 21.

The headrest frame 20 is made of a metal material such as steel, and is formed of two rectangular plates, that is, a first plate 22 disposed on a front surface side of the headrest 4 and a second plate 23 disposed on a rear surface side of the headrest 4. Left and right edge portions and an upper edge portion of the first plate 22 are joined to left and right edge portions and an upper edge portion of the second plate 23, and a gap is provided between the first plate 22 and the second plate 23 except for the joined edge portions. Lower edge portions of the first plate 22 and the second plate 23 are fixed to the upper frame 13 of the seat back frame 10 by welding and the like.

A dimension W of the headrest frame 20 in a seat width direction is smaller than a dimension H of the headrest frame 20 in a seat height direction, and the headrest frame 20 is long in an upper-lower direction. At the time of a vehicle collision, although the head of the occupant collides with an upper portion of the headrest 4, and a load is input to an upper portion of the headrest frame 20, it is difficult to obtain a flexural rigidity of the headrest frame 20 because of a frame shape which is long in the upper-lower direction. Therefore, the headrest frame 20 is formed of two plates, that is, the first plate 22 and the second plate 23, and the flexural rigidity of the headrest frame 20 is compensated.

The frame shape is not limited. In a case where, for example, the dimension W in the seat width direction can be set larger than the dimension H in the seat height direction, and the flexural rigidity of the frame can be ensured in terms of shape, the headrest frame 20 may be formed by a single plate.

An abutting portion 24 is provided at a lower portion of the headrest frame 20, and is located rearer of the headrest 4 than the upper portion of the headrest frame 20 is. In the example illustrated in FIGS. 1 and 2, the abutting portion 24 is configured with a convex portion formed by press working and the like and provided at a central portion of the second plate 23 in the seat width direction, but the number of convex portions configuring the abutting portion 24 is not limited to one, and the convex portion is not limited to the one formed integrally with the second plate 23.

The pad 21 is formed of a single pad material such as soft urethane foam. The pad. 21 may be formed of two types of pad materials, that is, a soft pad material and a hard pad material, but when the pad 21 is formed of a single soft pad material, it is possible to reduce the cost by omitting the high-cost hard pad material and reducing the number of components.

Figure 3:
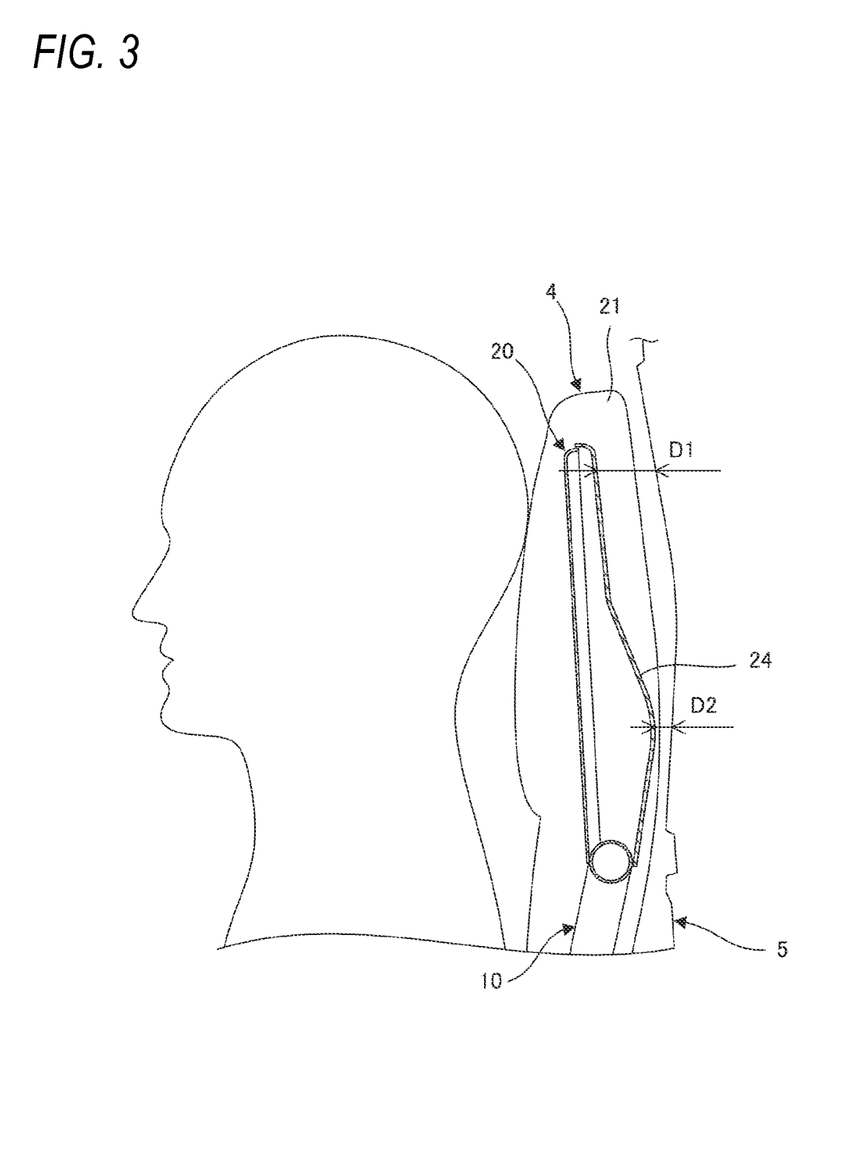
FIG. 3 is a schematic view illustrating an operation of a headrest of FIG. 1.
Figure 4:
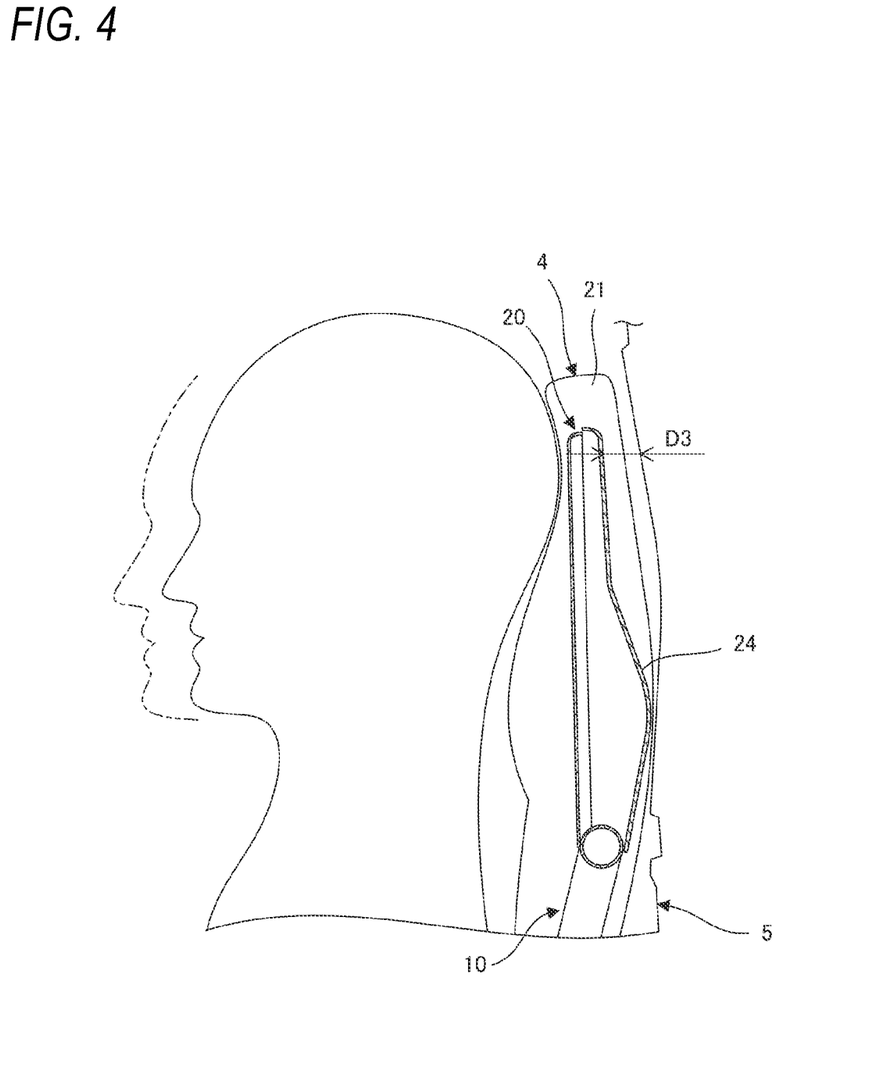
FIG. 4 is a schematic view illustrating the operation of the headrest of FIG. 1.
Figure 5:
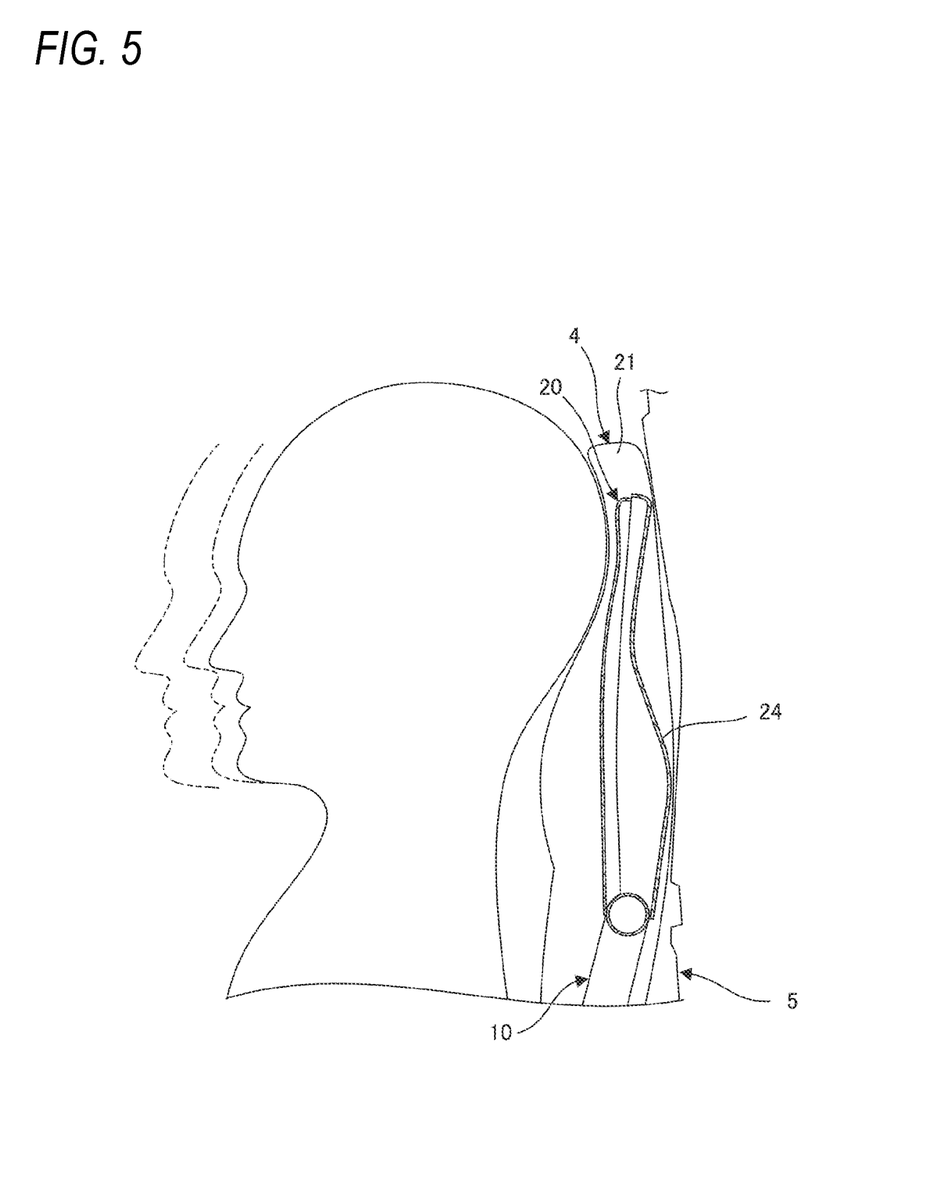
FIG. 5 is a schematic view illustrating the operation of the headrest of FIG. 1.

FIGS. 3 to 5 illustrate an operation of the headrest 4.

As illustrated in FIG. 3, a panel 5 that forms a rear wall of a cabin where the seat 1 is installed is disposed behind the headrest 4. A distance D1 between an upper end portion of the headrest frame 20 and the panel 5 is larger than a distance D2 between the panel 5 and the abutting portion 24 located nearer of the headrest 4 than the upper portion of the headrest frame 20 is. At the time of a vehicle collision, the headrest 4 is pushed by the head of the occupant, and is displaced rearward with the deflection of the headrest frame 20 and the seat back frame 10. A part of energy of the collision is absorbed by the deflection of the headrest frame 20 and the seat back frame 10.

As illustrated in FIG. 4, the headrest 4 displaced rearward abuts on the panel 5. The abutting portion 24 at the lower portion of the headrest frame 20 is located closer to the rear surface side of the headrest 4 than the upper portion of the headrest frame 20 is, and the abutting portion 24 abuts on the panel 5 earlier than the upper portion of the headrest frame 20 when the headrest 4 abuts on the panel 5. A gap D3 is provided between the upper end portion of the headrest frame 20 and the panel 5 when the abutting portion 24 abuts on the panel 5.

As illustrated in FIG. 5, after the abutting portion 24 abuts on the panel 5, the upper portion of the headrest frame 20 located above the abutting portion 24 is deflected with the abutting portion 24 as a fulcrum so as to narrow the distance D3, and abuts on the panel 5. A part of the energy of the collision is absorbed by the deflection of the upper portion of the headrest frame 20.

When the energy of collision is larger than the energy absorbed by the deflection of the headrest frame 20 and the seat back frame 10 until the upper portion of the headrest frame 20 abuts on the panel 5, the headrest 4 is further displaced rearward with deformation of the panel 5. The energy of the collision that remains unabsorbed by the deflection of the headrest frame 20 and the seat back frame 10 is absorbed by the deformation of the panel 5, FIGS. 6 and 7 illustrate an operation of a headrest of a reference example.

Figure 6:
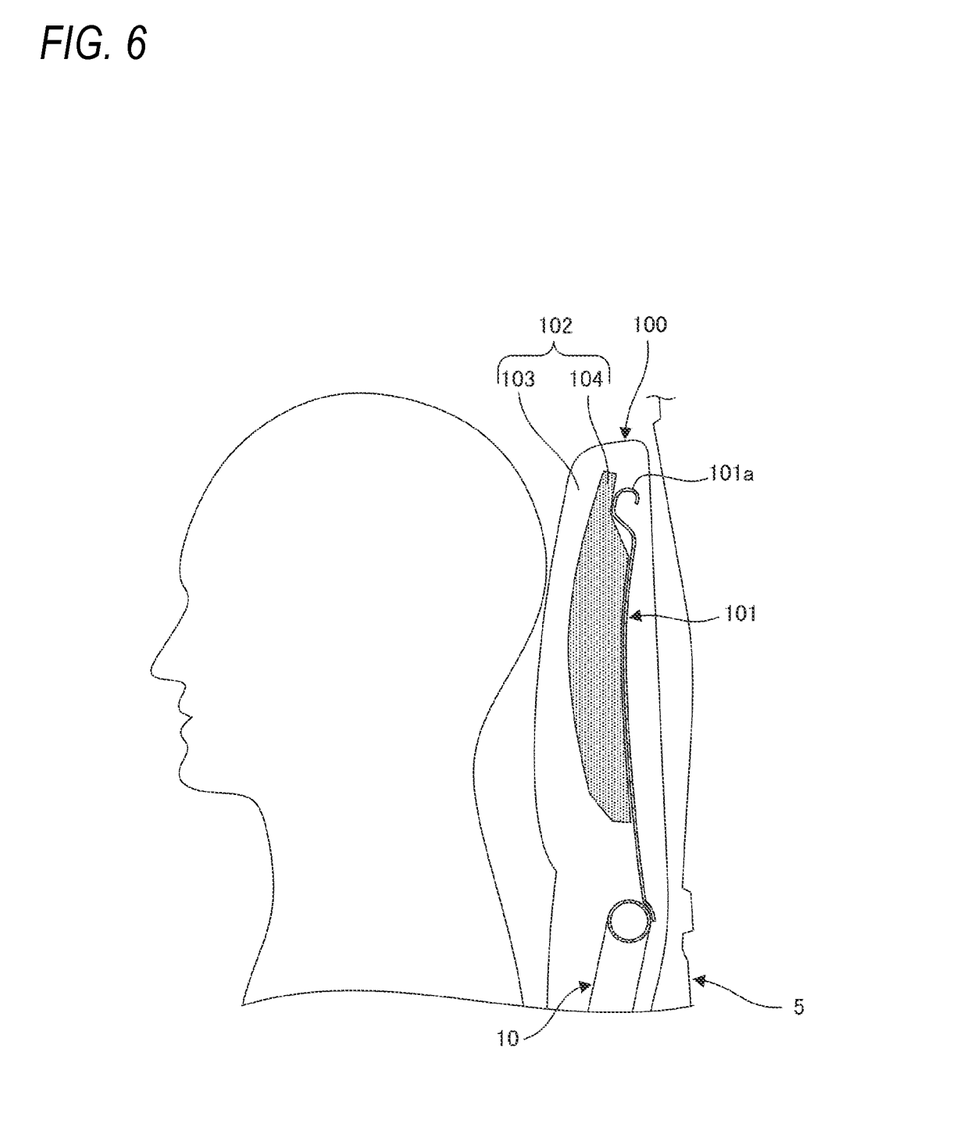
FIG. 6 is a schematic view illustrating an operation of a headrest of a reference example.

A headrest 100 of a reference example illustrated in FIG. 6 includes a headrest frame 101 and a pact 102 that covers the headrest frame 101. The headrest frame 101 is formed of a single rectangular plate, and edge portions 101a on both left and right sides and an upper side of the plate are subjected to curl-bending processing. Flexural rigidity of the frame is ensured by the curl-bending processing of the edge portion 101a. A distance between the panel 5 and each portion of the headrest frame 101 is substantially the same from an upper end portion to a lower end portion of the headrest frame 101. The pad 102 includes a soft pad material 103 and a hard pad material 104, and the hard pad material 104 is disposed between the headrest frame 101 and the soft pad material 103 that covers a front surface side of the headrest 100.

Figure 7:
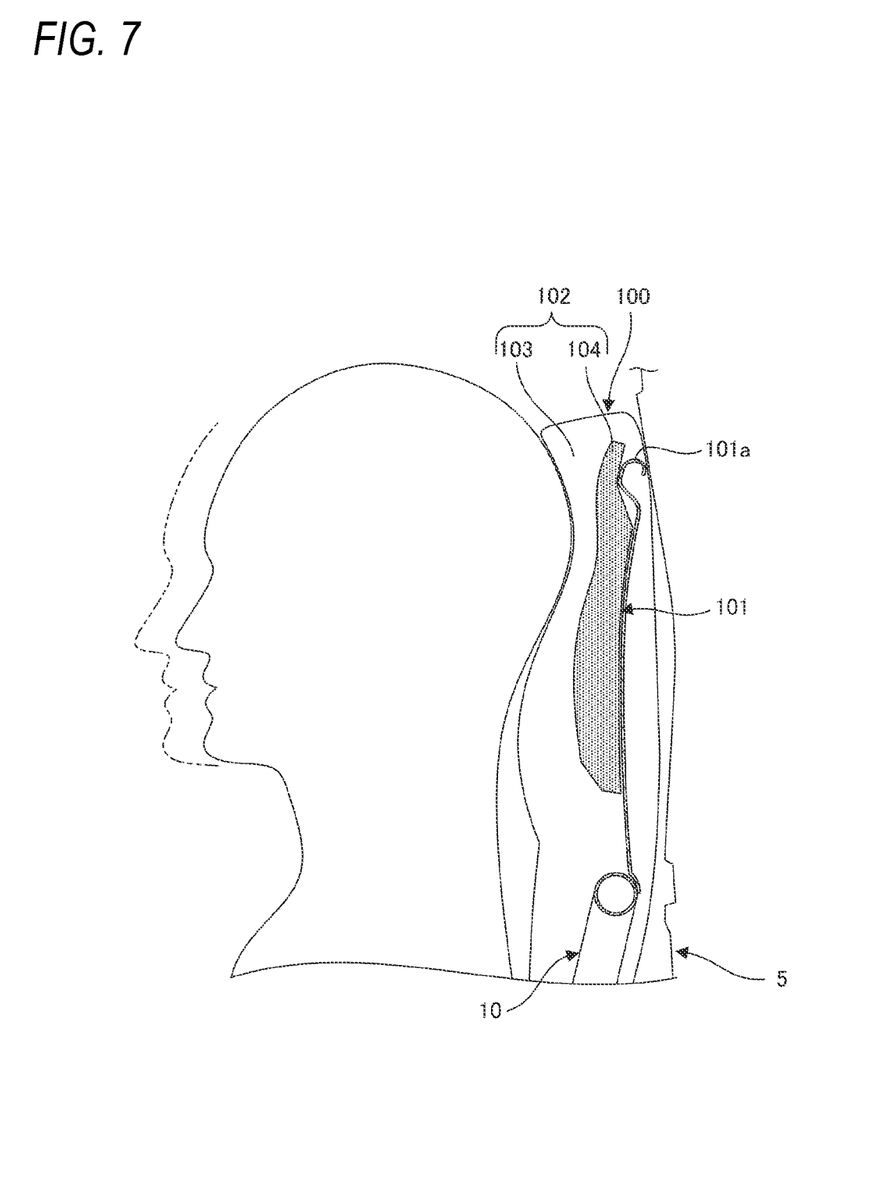
FIG. 7 is a schematic view illustrating the operation of the headrest of the reference example.

As illustrated in FIG. 7, at the time of a vehicle collision, the headrest 100 is pushed by the head of the occupant, and is displaced rearward with the deflection of the headrest frame 101, the hard pad material 104, and the seat back frame 10. The headrest 100 displaced rearward abuts on the panel 5, but when the headrest 100 abuts on the panel 5, the upper end portion of the headrest frame 101 abuts on the panel 5.

When the energy of collision is larger than the energy absorbed by the deflection of the headrest frame 101, the hard pad material 104, and the seat back frame 10 until the upper end portion of the headrest frame 101 abuts on the panel 5, the headrest 100 is further displaced rearward with the deformation of the panel 5. The energy of the collision that remains unabsorbed by the deflection of the headrest frame 101, the hard pad material 104, and the seat back frame 10 is absorbed by the deformation of the panel 5.

Figure 8:
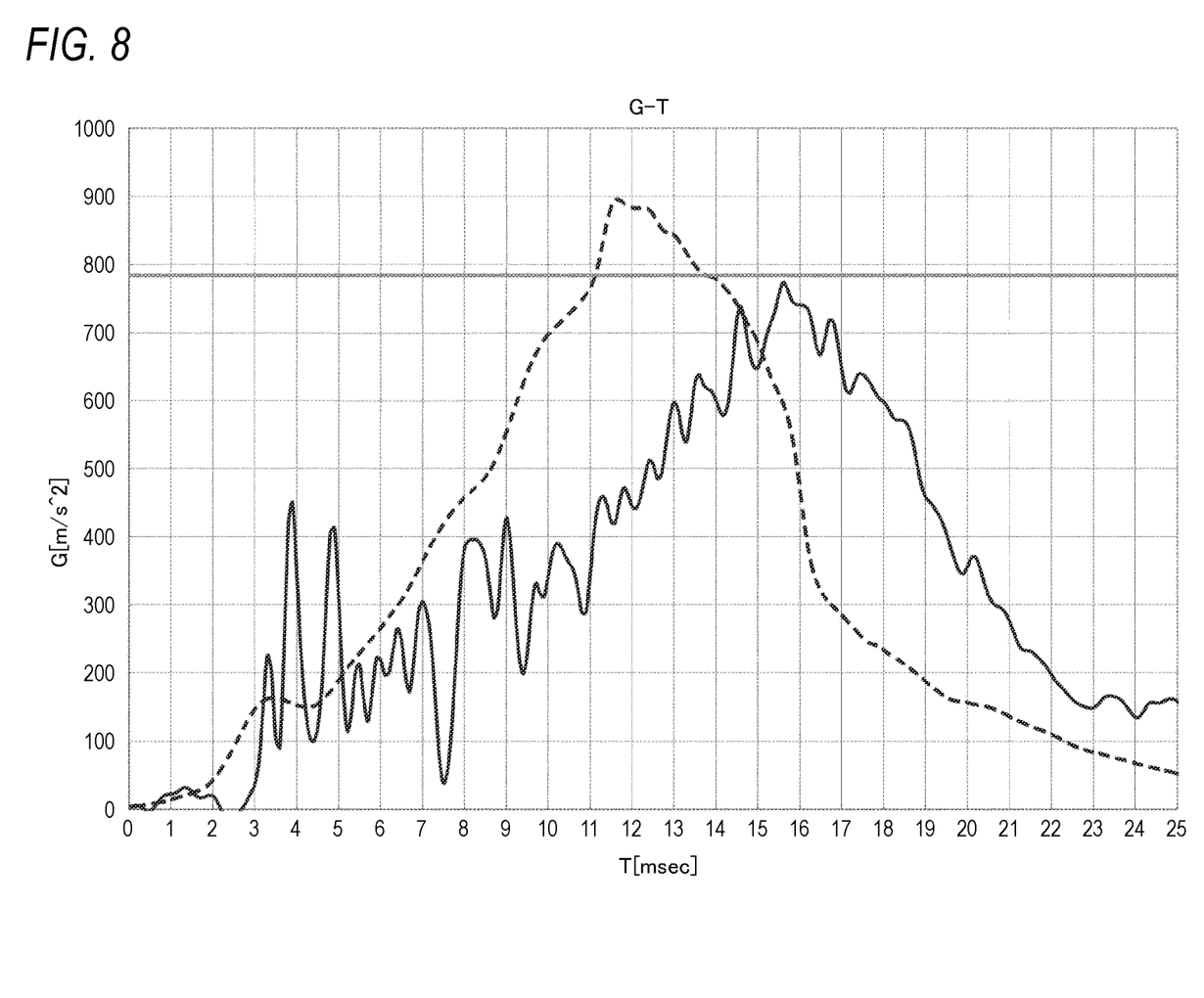
FIG. 8 is a graph illustrating an example of evaluation results of collision tests of the headrest of FIG. 1 and the headrest of the reference example of FIG. 6.

FIG. 8 illustrates an example of evaluation results of collision tests of the headrest 4 and the headrest 100.

The collision test was performed in accordance with a test procedure of an energy dissipation check defined by Regulation No. 17 UNIFORM PROVISIONS CONCERNING THE APPROVAL OF VEHICLES WITH REGARD TO THE SEATS, THEIR ANCHORAGES AND ANY HEAD RESTRAINTS_5.2.3.1. In the above provisions, it is required that the deceleration acting on a head model does not continuously exceed 80 G (784 m/s$^2$) during 3 ms.

FIG. 8 illustrates a relationship between time from the collision of the head model with the headrest and the deceleration acting on the head model, in which a solid line represents the evaluation result of the headrest 4 and a broken line represents the evaluation result of the headrest 100. An area of a region surrounded by each of the solid line and the broken line and a horizontal axis corresponds to the energy of the collision.

In the evaluation result of the headrest 100 indicated by the broken line, the deceleration does not continuously exceed 80 (3 during 3 ms, but a peak value of the deceleration exceeds 80 G. If the hard pad material 104 is omitted, it is expected that the deceleration continuously exceeds 80 G during 3 ms.

On the other hand, in the evaluation result of the headrest 4 indicated by the solid line, the deceleration does not continuously exceed 80 G during 3 ms, and a peak value of the deceleration is also less than 80 G. It can be said that the impact mitigation performance of the headrest 4 is improved as compared with the headrest 100 including the hard pad material 104 although the pad 21 is formed of the single soft pad material.

A reason why the impact mitigation performance of the headrest 4 is improved is that the energy of the collision is effectively absorbed by the deflection of the headrest frame 20.

When the headrest collides with the head model, the load is input to the upper portion of the headrest frame, and in the headrest 100, the upper end portion of the headrest frame 101 abuts on the panel 5 first. That is, a load input portion of the headrest frame 101 is supported by the panel 5 at an initial stage of the collision. Therefore, the deflection of the headrest frame 101 is restricted.

In contrast, in the headrest 4, the abutting portion 24 provided at the lower portion of the headrest frame 20 abuts on the panel 5 earlier than the upper portion of the headrest frame 20. The gap D3 is provided between the upper end portion of the headrest frame 20 and the panel 5 when the abutting portion 24 abuts on the panel 5 (see FIG. 5), and there is room for the upper portion of the headrest frame 20 to be further deflected. The energy of the collision is effectively absorbed by the additional deflection of the upper portion of the headrest frame 20.

In this way, since the energy of the collision is effectively absorbed by the deflection of the headrest frame 20, the hard pad material can be omitted without impairing the impact mitigation performance. By omitting the hard pad material, the thickness of the pad 21 is reduced, the headrest frame 20 is moved toward a front side of the headrest 4, the distance between the upper end portion of the headrest frame 20 and the panel 5 is further increased, and the absorption of energy based on the deflection of the headrest frame 20 can be increased. Accordingly, the impact mitigation performance of the headrest 4 can be further enhanced.

The headrest frame 20 is formed in a hollow box shape by two plates, that is, the first plate 22 and the second plate 23. Accordingly, the first plate 22 on the front surface side that receives the head can be deformed so as to be recessed inward, and due to the deformation of the first plate 22, the absorption of energy based on the deformation of the headrest frame 20 can be increased.

Although the present invention has been described by taking the seat 1 mounted on a vehicle such as an automobile as an example, the configuration of the seat 1 is also applicable to a vehicle seat for an aircraft or a ship other than the vehicle.

As described above, a headrest of a vehicle seat disclosed in the present specification includes a headrest frame formed of at least one plate and fixed to a seat back frame of the vehicle seat; a pad covering the headrest frame; and a cover covering the pad, in which an abutting portion is provided at a lower portion of the headrest frame, the lower portion being disposed proximal to a seat back frame, and the abutting portion is located rearer of the headrest than an upper portion of the headrest frame, the upper portion being disposed distal to the seat back frame.

Further, in the headrest of a vehicle seal disclosed in the present specification, the headrest frame includes a first plate disposed on a front surface side of the headrest and a second plate disposed on a rear surface side of the headrest, an edge portion of the first plate and an edge portion of the second plate are joined to each other, and a gap is provided between the first plate and the second plate except for the joined edge portions.

Further, in the headrest of a vehicle seat disclosed in the present specification, a dimension of the headrest frame in a seat width direction is smaller than a dimension of the headrest frame in a seat height direction.

Further, in the headrest of a vehicle seat disposed in the present description, the pad is formed of a single pad material.

Further, a vehicle seat disclosed in the present disclosure includes the headrest.

Although the embodiments are described above with reference to the drawings, it is needless to say that the present invention is not limited to such examples. It will be apparent to those skilled in the art that various changes and modifications may be conceived within the scope of the claims. It is also understood that the various changes and modifications belong to the technical scope of the present invention. Components in the embodiments described above may be optionally combined within a range not departing from the spirit of the invention.

REFERENCE SIGNS LIST 1 vehicle seat
2 seat cushion
3 seat back
4 headrest
5 panel
10 seat back frame
11 pad
12 back side frame
13 upper frame
14 lower frame
20 headrest frame
21 pad
22 first plate
23 second plate
24 abutting portion
100 headrest
101 headrest frame
102 pad
103 soft pad material
104 hard pad material

The invention claimed is:

1. A headrest of a vehicle seat comprising:
a headrest frame formed of at least one plate and fixed to a seat back frame of the vehicle seat;
a pad covering the headrest frame; and
a cover covering the pad,
wherein a lower edge of the plate of the headrest is directly fixed to the seat back frame,
wherein an abutting portion is provided at a lower portion of the headrest frame, the lower portion being disposed proximal to a seat back frame, the abutting portion serving as a fulcrum when an upper portion of the headrest is deflected in a vehicle collision, and
wherein the abutting portion is located rearer of the headrest than an upper portion of the headrest frame, the upper portion being disposed distal to the seat back frame.

2. The headrest according to claim 1,
wherein the headrest frame includes a first plate disposed on a front surface side of the headrest and a second plate disposed on a rear surface side of the headrest,
wherein edge portions of the first plate and the second plate are joined to each other, and
wherein a gap is provided between the first plate and the second plate except for the joined edge portions.

3. The headrest according to claim 2,
wherein a dimension of the headrest frame in a seat width direction is smaller than a dimension of the headrest frame in a seat height direction.
4. The headrest according to claim 1,
wherein the pad is formed of a single pad material.
5. A vehicle seat comprising:
the headrest according to claim 1.
6. A headrest of a vehicle seat comprising:
a headrest frame formed of at least one plate and fixed to a seat back frame of the vehicle seat;
a pad covering the headrest frame; and
a cover covering the pad,
wherein the headrest includes an upper portion and a lower portion, the upper being configured to support a head of an occupant,
wherein the headrest frame includes an upper portion disposed inside the upper portion of the headrest and a lower portion disposed inside the lower portion of the head rest,
wherein an abutting portion is provided at a lower portion of the headrest frame, the lower portion being disposed proximal to a seat back frame,
wherein the abutting portion is located rearer of the headrest than an upper portion of the headrest frame, the upper portion being disposed distal to the seat back frame, and
wherein the abutting portion serves as a fulcrum when the upper portion of the headrest is deflected in a vehicle collision.

* * * * *